(12) United States Patent
Kim

(10) Patent No.: US 8,269,832 B2
(45) Date of Patent: Sep. 18, 2012

(54) APPARATUS FOR MEASURING AND DISPLAYING A FACTOR, METHOD FOR MEASURING AND DISPLAYING A FACTOR, A PROGRAM FOR MEASURING AND DISPLAYING A FACTOR BEING CONFIGURED TO CAUSE A COMPUTER TO RUN A METHOD FOR MEASURING AND DISPLAYING A FACTOR, AND SOUND SCANNER

(75) Inventor: YoungKey Kim, Daejeon (KR)

(73) Assignee: SM Instruments Co., Ltd., Daejeon (KR)

( * ) Notice: Subject to any disclaimer, the term of this patent is extended or adjusted under 35 U.S.C. 154(b) by 341 days.

(21) Appl. No.: 12/671,885

(22) PCT Filed: Aug. 1, 2008

(86) PCT No.: PCT/KR2008/004486
§ 371 (c)(1),
(2), (4) Date: Feb. 2, 2010

(87) PCT Pub. No.: WO2009/020308
PCT Pub. Date: Feb. 12, 2009

(65) Prior Publication Data
US 2011/0261192 A1    Oct. 27, 2011

(30) Foreign Application Priority Data
Aug. 3, 2007  (KR) .................... 10-2007-0078051

(51) Int. Cl.
*H04N 7/18*   (2006.01)
*G01F 17/00*  (2006.01)
*G06K 9/00*   (2006.01)
*H04M 11/04*  (2006.01)

(52) U.S. Cl. ........ 348/135; 382/181; 702/51; 455/404.1

(58) Field of Classification Search ................. None
See application file for complete search history.

(56) References Cited

U.S. PATENT DOCUMENTS 7,133,661 B2 * 11/2006 Hatae et al. ............... 455/404.1
7,289,918 B2 * 10/2007 Nagase ........................ 702/51
7,474,197 B2    1/2009 Choi et al.

FOREIGN PATENT DOCUMENTS

| JP | 05-172620 A | 7/1993 |
| KR | 1995-0026536 A | 10/1995 |
| KR | 20-0210701 Y1 | 1/2001 |
| KR | 10-2005-0095386 A | 9/2005 |

* cited by examiner

*Primary Examiner* — Wen-Tai Lin
(74) *Attorney, Agent, or Firm* — Global IP Counselors, LLP

(57) ABSTRACT

A method for measuring and displaying a factor includes: sensing a factor by using a sensing unit, which is movable in a plane, a curved surface, or a space where the factor for sensing is generated or contained and senses the factor; photographing the plane, the curved surface, or the space; simultaneously recognizing a position of the sensing unit by targeting the sound sensing unit when sensing the factor in the step of sensing; generating a factor map data by mapping the factor sensed in the step of sensing onto the position sensed in the step of recognizing; overlaying the factor map data with the picture data; and displaying the factor map data overlaid with the picture data.

16 Claims, 7 Drawing Sheets

APPARATUS FOR MEASURING AND DISPLAYING A FACTOR, METHOD FOR MEASURING AND DISPLAYING A FACTOR, A PROGRAM FOR MEASURING AND DISPLAYING A FACTOR BEING CONFIGURED TO CAUSE A COMPUTER TO RUN A METHOD FOR MEASURING AND DISPLAYING A FACTOR, AND SOUND SCANNER

CROSS-REFERENCE TO RELATED APPLICATIONS

This U.S. National stage application claims priority under 35 U.S.C. §119(a) to Korean Patent Application No. 10-2007-0078051, filed in the Republic of Korea on Aug. 3, 2007, the entire contents of which are hereby incorporated herein by reference.

BACKGROUND OF THE INVENTION

1. Technical Field

The present invention relates to an apparatus for measuring and displaying a factor, a method for measuring and displaying a factor, a program for measuring and displaying a factor being configured to cause a computer to run a method for measuring and displaying a factor, and a sound scanner.

2. Background Information

Heretofore, the level and the generation/containment position etc. of a factor are measured at a device, a plane, a curved surface, a space where the factor (for example, sound, vibration, temperature, humidity, supersonic waves, or electromagnetic waves, etc.) is generated or contained. For example, at a factory that produces electronic devices or mechanical devices, the factor of noise, vibration, electromagnetic waves, or the like, which influences the quality of the electronic devices or the mechanical devices, is measured. More specifically, in the case of an automobile, the level and the generation position of the noise that is generated at the door by trembling of engine on driving are measured. Also, in the case of industrial facilities, vibration, temperature, humidity, etc. that influence maintenance and operation of the industrial facilities are measured. More specifically, in the case of an atomic power plant, the level and the generation position of vibration, which is generated at the pipe lines, which are installed in the atomic power plant, are measured. Also, in the case of a research institute, temperature, humidity, or the like of a specimen that influences experimental results are measured.

However, it is not difficult to measure the level and the generation/containment position of a factor in a case in which the device, the plane, the curved surface, or the space is small or narrow, but it is difficult and takes a long time to measure the level and the generation/containment position of a factor in a case in which the device, the plane, the curved surface, or the space is large or wide.

However, a special solution for this inconvenience has not been presented. Therefore, after a measurer locates the sensing unit in the specific region of the device, the plane, the curved surface, or the space where a factor for measuring is generated or contained, the measurer only measures the level of the factor and where the factor is generated or contained by repeating operations for sensing the factor and recording its position one by one.

In order to save trouble for the measurer and to reduce the time it takes for the measurer to sense and record, there is a method for measuring by using a plurality of the sensing units whose number corresponds to the number of parts to be sensed in the device, the plane, and the curved surface and installed in the space where the factor for measuring is generated or contained. However, this method not only costs a great deal because of the need to install a plurality of the sensing units, but also is inconvenient to install new sensing units from time to time because the number of parts to be sensed is not always identical.

SUMMARY OF THE INVENTION

Accordingly, an embodiment of the present invention has been made to solve the above-mentioned problems, and an object of the present invention is to provide an apparatus for measuring and displaying a factor, a method for measuring and displaying a factor, a program for measuring and displaying a factor being configured to cause a computer to run a method for measuring and displaying a factor and a sound scanner that can measure and display a factor easily and comfortably.

Another object of the present invention is to provide an apparatus for measuring and displaying a factor, a method for measuring and displaying a factor, a program for measuring and displaying a factor being configured to cause a computer to run a method for measuring and displaying a factor, and a sound scanner that can measure and display precisely the level and the generation or containment position of the factor.

Still another object of the present invention is to provide an apparatus for measuring and displaying a factor, a method for measuring and displaying a factor, a program for measuring and displaying a factor being configured to cause a computer to run a method for measuring and displaying a factor, and a sound scanner that can reduce a measuring cost, a manufacturing cost, etc.

In addition to the above objects, the present invention has additional technical objects not described above, which can be clearly understood by those skilled in the art from the following description.

An apparatus for measuring and displaying a factor according to a first aspect of the present invention is an apparatus for measuring and displaying a factor that includes: a sensing unit being movable in a plane, a curved surface or a space where a factor for sensing is generated or contained and sensing the factor; a photographing unit photographing the plane, the curved surface, or the space and generating a picture data of the plane, the curved surface, or the space; a sensing position recognition unit recognizing simultaneously a position of the sensing unit by targeting the sound sensing unit when the sensing unit senses the factor; a factor map data generation unit mapping the factor sensed in the sensing unit onto the position sensed in the sensing position recognition unit and generating a factor map data; and a display unit overlaying the factor map data with the picture data and displaying the factor map data overlaid with the picture data.

In this apparatus for measuring and displaying a factor, the sensing unit senses a factor which is generated or contained in the plane, the curved surface, or the space. Also, the sensing unit can move in the plane, the curved surface, or the space. The photographing unit photographs the plane, the curved surface, or the space where the sensing unit is located when the sensing unit senses the factor, and generates a picture data of the plane, the curved surface, or the space. The sensing position recognition unit targets the sensing unit and trails the position of the sensing unit, and recognizes the position of the sensing unit when the sensing unit senses the factor in the plane, the curved surface, or the space. The factor map generation unit maps the factor sensed in the sensing unit onto the position sensed in the sensing position recognition unit, and generates factor map data. In other words, the factor map data include factor data and position data. Here, in order to show the sensed factor quantitatively, the factor data are data that express the factor numerically according to a prescribed standard and indicate the numeral size of the number. Also, the position data are data that express the position of the recognized sensing unit as two-dimensional or three-dimensional coordinate data. The display unit overlays the factor map data with the picture data and displays the factor map data overlaid with the picture data. Accordingly, at least one of the plane, the curved surface, or the space which becomes the background, and the sensing unit, which is stopping or moving, and an indicator, which expresses the factor quantitatively in the position of the sensing unit, is displayed in the picture indicated by the display unit.

Consequently, since this apparatus for measuring and displaying a factor moves the sensing unit and senses the factor and it is unnecessary to record the sensing position separately, it can measure and display the factor easily and conveniently. Also, since it senses and displays as moving the sensing unit in the plane, the curved surface, or the space, it can measure and display the level and the generation/containment position of a factor precisely. Also, since it senses with only one sensing unit without the necessity to install a plurality of the sensing units, it can reduce a measuring cost, a manufacturing cost, etc.

An apparatus for measuring and displaying a factor according to a second aspect of the present invention is the apparatus for measuring and displaying a factor according to the first aspect of the present invention, which further includes a target unit installed near to the sensing unit, wherein the target unit targets the sensing unit.

This apparatus for measuring and displaying a factor further includes a target unit that is installed near to the sensing unit and targets the sensing unit. The sensing position recognition unit recognizes the target unit, so the position at which the sensing unit senses the factor is recognized. Here, in the target unit, various target units can be used according to a method of how the sensing position recognition unit recognizes the position, and composition and feature of the target unit also can be changed.

Consequently, since this apparatus for measuring and displaying a factor further includes the target unit, it can sense the position of the sensing unit well.

An apparatus for measuring and displaying a factor according to a third aspect of the present invention is the apparatus for measuring and displaying a factor according to the first aspect of the present invention, wherein the sensing position recognition unit recognizes the position of the sensing unit by at least one of a color, a size or a shape of the target unit.

In this apparatus for measuring and displaying a factor, the sensing position recognition unit recognizes the position of the sensing unit by at least one of the color, the size or the shape of the target unit. More specifically, the sensing position recognition unit prescribes in advance a feature of at least one of the color, the size or the shape of the target unit. Then, it detects data, which have a feature of the target unit prescribed in the picture data of the plane, the curved surface, or the space photographed in the photographing unit. Also, it judges the detected data as the picture data for displaying the target unit in the whole picture data and recognizes the position of the sensing unit.

Consequently, since the sensing position recognition unit recognizes the position of the sensing unit by at least one of the color, the size or the shape of the target unit, this apparatus for measuring and displaying a factor can recognize the position of the sensing unit well. Also, since this method for recognizing the position of the sensing unit uses the photographed picture data and it is unnecessary to add a new component for obtaining and processing the other data, the manufacturing cost can be reduced.

An apparatus for measuring and displaying a factor according to a fourth aspect of the present invention is the apparatus for measuring and displaying a factor according to the first or the second aspect of the present invention, and further includes a storage unit storing the factor or the picture data.

This apparatus for measuring and displaying a factor further comprises a storage unit that stores the factor sensed in the sensing unit or the picture data of the plane, the curved surface, or the space photographed in the photographing unit. Since the factor or the picture data stored in the storage unit is raw data, it can be used by being read from the storage unit anytime. Accordingly, it is possible to re-measure or re-display the factor. Also, it is possible to measure or to display the factor after accumulating the results to be measured or displayed.

Consequently, since this apparatus for measuring and displaying a factor further includes the storage unit, it can measure and display the factor variously.

An apparatus for measuring and displaying a factor according to a fifth aspect of the present invention is the apparatus for measuring and displaying a factor according to the first or the second aspect of the present invention, wherein the sensing unit senses continuously or intermittently with time when sensing the factor.

In this apparatus for measuring and displaying a factor, the sensing unit senses continuously or intermittently with time when sensing the factor. More specifically, since the sensing unit has a switch unit (not shown in the drawings), etc. that can turn a sensing operation on/off and always keep the switch unit on, it can sense the factor continuously. Also, since it repeats an operation for turning the switch unit on/off as occasion demands, it can sense the factor intermittently.

Consequently, since this apparatus for measuring and displaying a factor senses the factor continuously or intermittently, it can sense the factor selectively.

An apparatus for measuring and displaying a factor according to a sixth aspect of the present invention is the apparatus for measuring and displaying a factor according to the first or the second aspect of the present invention, wherein the display unit displays continuously or intermittently with time when displaying the factor map data overlaid with the picture data.

This apparatus for measuring and displaying a factor displays the factor map data in the display unit continuously or intermittently with time in the plane, the curved surface, or the space.

Consequently, since this apparatus for measuring and displaying a factor displays the factor continuously or intermittently, it can measure the factor selectively.

An apparatus for measuring and displaying a factor according to a seventh aspect of the present invention is the apparatus for measuring and displaying a factor according to the first or the second aspect of the present invention, wherein the display unit displays the factor map data with at least one of color dot, number or contour.

In this apparatus for measuring and displaying a factor, the display unit displays the factor map data with at least one of the color dot, the number, or the contour. Accordingly, the plane, the curved surface, or the space which becomes the background, and the sensing unit which is stopping or moving, and at least one of the color dot, the number, or the contour which is located in the sensing unit, are displayed.

Here, in order to display the factor quantitatively, the display unit displays the high or the low of the level of the factor in case of the color dot and contour by changing the color, or in case of the number by the numeral size of the number.

Consequently, since this apparatus for measuring and displaying a factor displays the factor variously or in various ways, the factor can be recognized easily by the measurer.

An apparatus for measuring and displaying a factor according to a eighth aspect of the present invention is the apparatus for measuring and displaying a factor according to the seventh aspect of the present invention, wherein a transparency of at least one of the color dot, the number, or the contour is controlled in the display unit.

In the apparatus for measuring and displaying a factor, the display unit controls the transparency of at least one of the color dot, the number, or the contour to display. At this time, when raising the transparency, the plane, the curved surface, or the space which is a picture data is well displayed, and when lowering the transparency, one of the color dot, the number, or the contour which is factor map data is well displayed. The measurer can select the transparency as the occasion arises.

Consequently, since this apparatus for measuring and displaying a factor displays the factor more variously, and one of the plane, the curved surface, or the space, or the color dot, the number, or the contour can be recognized easily by the measurer.

An apparatus for measuring and displaying a factor according to a ninth aspect of the present invention is the apparatus for measuring and displaying a factor according to the first or the second aspect of the present invention, wherein the factor is at least one of sound, vibration, temperature, humidity, supersonic waves, or electromagnetic waves.

This apparatus for measuring and displaying a factor senses the factor of at least one of the sound, the vibration, the temperature, the humidity, the supersonic waves or the electromagnetic waves, recognizes the position, overlays the recognized position with the picture data, and displays the recognized position overlaid with the picture data. Also, the present invention can sense various kinds of factors at a time. For this, it must have the sensing unit properly accorded to each of the factors.

Consequently, since this apparatus for measuring and displaying a factor senses and displays various factors, it can sense various kinds of the factors at a time and raise a sensing efficiency.

An apparatus for measuring and displaying a factor according to a tenth aspect of the present invention is the apparatus for measuring and displaying a factor according to the first or the second aspect of the present invention, wherein the sensing unit is contacted or non-contacted with the plane or the curved surface.

This apparatus for measuring and displaying a factor can use the sensing unit contacted or non-contacted with the plane or the curved surface.

Consequently, this apparatus for measuring and displaying a factor can use various sensing units.

An apparatus for measuring and displaying a factor according to a eleventh aspect of the present invention is the apparatus for measuring and displaying a factor according to the first or the second aspect of the present invention, wherein the photographing unit photographs by using more than two cameras.

In this apparatus for measuring and displaying a factor, the photographing unit photographs by using cameras. When the sensing unit senses 3-dimensional space, since the photographing unit photographs by using more than two cameras, the display unit can display the picture in 3-dimensions.

Consequently, since this apparatus for measuring and displaying a factor displays the picture in 3-dimensions in the display unit, it can display a sensing result of the factor in 3-dimensional space.

An apparatus for measuring and displaying a factor according to a twelfth aspect of the present invention is the apparatus for measuring and displaying a factor according to the first or the second aspect of the present invention, wherein operations, which sense the factor, recognize the position, and display the factor map data overlaid with the picture data, are accomplished in real time.

This apparatus for measuring and displaying a factor measures and displays the factor in real time. In other words, operations, which sense the factor, recognize the position, and display the factor map data overlaid with the picture data are accomplished in real time.

Consequently, this apparatus for measuring and displaying a factor can display information of the factor sensed in real time.

A method for measuring and displaying a factor according to a thirteenth aspect of the present invention is a method for measuring and displaying a factor which includes the steps of: sensing a factor by using a sensing unit, which is movable in a plane, a curved surface or a space where the factor for sensing is generated or contained and senses the factor; photographing the plane, the curved surface, or the space; recognizing simultaneously a position of the sensing unit by targeting the sound sensing unit when sensing the factor in the step of sensing; generating a factor map data by mapping the factor sensed in the step of sensing onto the position sensed in the step of recognizing; overlaying the factor map data with the picture data; and displaying the factor map data overlaid with the picture data.

In this method for measuring and displaying a factor, the step of sensing senses the factor generated or contained in the plane, the curved surface, or the space by using the sensing unit. The sensing unit can move in the plane, the curved surface, or the space. When the step of sensing senses the factor, the step of photographing photographs the plane, the curved surface, or the space where the sensing unit is located, and generates the picture data of the plane, the curved surface, or the space. The step of recognizing targets the sensing unit and trails the position of the sensing unit, and recognizes the position of the sensing unit when sensing the factor in the plane, the curved surface, or the space. The step of generating maps the factor sensed in the step of sensing onto the position of the sensing unit recognized in the step of recognizing, and generates the factor map data. In other words, the factor map data includes factor data and position data. Here, in order to show the sensed factor quantitatively, the factor data are data that express the factor numerically according to the prescribed standard and indicate the numeral size of the number. The position data are data that indicate the position of the sensing unit recognized as 2-dimensional or 3-dimensional coordinate data. The step of displaying overlays the factor map data with the picture data and displays the factor map data overlaid with the picture data. Accordingly, in the picture displayed in the step of displaying, the plane, the curved surface, or the space that becomes background, the sensing unit that is stopping or moving, the indicator that indicates the factor quantitatively in the position of the sensing unit, are displayed.

Consequently, since this method for measuring and displaying a factor senses the factor as moving the sensing unit and it is unnecessary to record the sensing position separately, it can measure and display the factor easily and conveniently. Also, since it senses and displays as moving the sensing unit in the plane, the curved surface, or the space, it can measure and display the level and the generation/containment position of the factor precisely. Also, since it senses by using only one sensing unit without the necessity to install a plurality of the sensing units, it can reduce a measuring cost, a manufacturing cost, etc.

This method for measuring and displaying a factor according to a fourteenth aspect of the present invention is the method for measuring and displaying a factor according to the thirteenth aspect of the present invention, wherein a target unit that targets the sensing unit is installed near to the sensing unit, and the step of recognizing recognizes the position of the sensing unit by at least one of a color, a size or a shape of the target unit.

This method for measuring and displaying a factor installs a target unit that targets the sensing unit near to the sensing unit. By recognizing the target unit in the step of recognizing, the position of the sensing unit is recognized. Here, in the target unit, various target units can be used according to a method how the sensing position recognition unit recognizes the position, and their compositions and features can be also changed. The step of recognizing recognizes the position of the sensing unit by at least one of the color, the size or the shape of the target unit. More specifically, the step of recognizing prescribes in advance a feature of at least one of the color, the size or the shape of the target unit. Then, it detects data that have the feature of the target unit prescribed in the picture data of the plane, the curved surface, or the space photographed in the step of photographing. It judges the detected data as the picture data for displaying the target unit in the whole picture data and recognizes the position of the sensing unit.

Consequently, since this method for measuring and displaying a factor installs the target unit, it can sense the position of the sensing unit. Also, since the step of recognizing recognizes by at least one of the color, the size or the shape of the target unit, it can recognize the position of the sensing unit well. Also, since a method for recognizing the position uses the picture data photographed and it is unnecessary to add a new component for obtaining and processing the other data, the manufacturing cost can be reduced.

A program for measuring and displaying a factor being configured to cause a computer to run a method for measuring and displaying a factor according to a fifteenth aspect of the present invention is a program for measuring and displaying a factor being configured to cause a computer to run a method for measuring and displaying a factor, that includes the steps of: sensing a factor by using a sensing unit, which is movable in a plane, a curved surface or a space where the factor for sensing is generated or contained and senses the factor; photographing the plane, the curved surface, or the space; recognizing simultaneously a position of the sensing unit when sensing the factor in the step of sensing by targeting the sensing unit; generating factor map data by mapping the factor sensed in the step of sensing onto the position sensed in the step of recognizing; overlaying the factor map data with the picture data; and displaying the factor map data overlaid with the picture data.

This program for measuring and displaying a factor being configured to cause a computer to run a method for measuring and displaying a factor is the program for measuring and displaying a factor for causing a computer to run the method for measuring and displaying a factor including the step of sensing, the step of photographing, the step of recognizing, the step of generating and the step of displaying. The step of sensing senses the factor generated or contained in the plane, the curved surface, or the space by using the sensing unit. The sensing unit can move in the plane, the curved surface, or the space. When the step of sensing senses the factor, the step of photographing photographs the plane, the curved surface, or the space where the sensing unit is located. The step of recognizing targets the sensing unit and trails the position of the sensing unit, and recognizes the position of the sensing unit when sensing the factor in the plane, the curved surface, or the space. The step of generating maps the factor sensed in the step of sensing onto the position recognized in the step of recognizing and generates the factor map data. In other words, the factor map data include factor data and position data. Here, in order to show the sensed factor quantitatively, the factor data are data that express the factor numerically according to the prescribed standard and indicate the numeral size of the number. The position data are data that indicate the position of the sensing unit recognized as 2-dimensional or 3-dimensional coordinate data. The step of displaying overlays the factor map data with the picture data and displays the factor map data overlaid with the picture data. Accordingly, in the picture displayed in the step of displaying, the plane, the curved surface, or the space which becomes background, the sensing unit which is stopping or moving, the indicator which indicates the factor quantitatively in the position of the sensing unit, are displayed.

Consequently, since this program for measuring and displaying a factor being configured to cause a computer to run a method for measuring and displaying a factor senses the factor as moving the sensing unit and it is unnecessary to record the position of the sensing unit separately, it can measure and display the factor easily and conveniently. Also, since it senses and displays as moving the sensing unit in the plane, the curved surface, or the space, it can measure and display the level and the generation/containment position of the factor precisely. Also, since it senses with only one sensing unit without the necessity to install a plurality of the sensing units, it can reduce a measuring cost, a manufacturing cost, etc.

A program for measuring and displaying a factor being configured to cause a computer to run a method for measuring and displaying a factor according to a sixteenth aspect of the present invention is a program for measuring and displaying a factor being configured to cause a computer to run a method for measuring and displaying a factor according to the fifteenth aspect of the present invention, wherein a target unit which makes the sensing unit targeted is installed near to the sensing unit, and the step of recognizing recognizes the position of the sensing unit by at least one of a color, a size or a shape of the target unit.

This program for measuring and displaying a factor being configured to cause a computer to run a method for measuring and displaying a factor installs a target unit, which makes the sensing unit targeted, near to the sensing unit. By recognizing the target unit in the step of recognizing, the position where the sensing unit senses the factor is recognized. Here, in the target unit, various target units can be used according to a method how the step of recognizing recognizes the position, and their compositions and features can be also changed. The step of recognizing recognizes the position of the sensing unit by at least one of the color, the size or the shape of the target unit. More specifically, the step of recognizing prescribes in advance a feature of at least one of the color, the size or the shape of the target unit. Also, it detects data that have the feature of the target unit prescribed in the picture data of the plane, the curved surface, or the space photographed in the step of photographing. It judges the detected data as the picture data for displaying the target unit in the whole picture data, and recognizes the position of the sensing unit.

Consequently, since this program for measuring and displaying a factor being configured to cause a computer to run a method for measuring and displaying a factor installs the target unit, it can sense the position of the sensing unit well. Since the step of recognizing recognizes the position of the sensing unit by at least one of the color, the size or the shape of the target unit, it can recognize the position of the sensing unit well. Also, since a method for recognizing the position uses the picture data photographed and it is unnecessary to add a new component for obtaining and processing the other data, the manufacturing cost can be reduced.

A sound scanner according to seventeenth aspect of the present invention is a sound scanner that includes: a sound sensing unit being movable in a plane, a curved surface or a space where a sound for sensing is generated or contained and sensing the sound; a photographing unit photographing the plane, the curved surface, or the space and generating picture data of the plane, the curved surface, or the space; a sensing position recognition unit recognizing simultaneously a position of the sound sensing unit by targeting the sound sensing unit when the sound sensing unit senses the sound; a sound map data generation unit mapping the sound sensed in the sound sensing unit onto the position sensed in the sensing position recognition unit and generating sound map data; and a display unit overlaying the sound map data with the picture data and displaying the sound map data overlaid with the picture data.

In this sound scanner, the sound sensing unit senses the sound generated or contained in the plane, the curved surface, or the space. Also, the sound sensing unit can move in the plane, the curved surface, or the space. The photographing unit photographs the plane, the curved surface, or the space where the sound sensing unit is located when the sound sensing unit senses the sound and generates the picture data of the plane, the curved surface, or the space. The sensing position recognition unit targets the sound sensing unit, and recognizes simultaneously the position of the sound sensing unit when the sound sensing unit senses the sound. The sound map data generation unit maps the sound sensed in the sound sensing unit onto the position recognized in the sensing position recognition unit, and generates the sound map data. In other words, the sound map data include factor data and position data. Here, in order to show the sensed sound quantitatively, the factor data are data that express the factor numerically according to the prescribed standard and indicate the numeral size of the number. Also, the position data are data that indicate the position of the sound sensing unit recognized as two-dimensional or three-dimensional coordinate data. The display unit overlays the sound map data with the picture data and displays the sound map data overlaid with the picture data. Accordingly, the plane, the curved surface, or the space which becomes the background, the sound sensing unit which is stopping or moving, the indicator which indicates the sound in the position of the sound sensing unit quantitatively, are displayed.

Consequently, since this sound scanner moves the sound sensing unit and senses the sound, and it is unnecessary to record the sensing position separately, it can measure and display the factor easily and conveniently. Also, since it senses and displays as moving the sound sensing unit in the plane, the curved surface, or the space, it can measure and display the level and the generation/containment position of the factor precisely. Also, since it senses with only one sensing unit without the necessity to install a plurality of the sensing units, it can reduce a measuring cost, a manufacturing cost, etc.

A sound scanner according to a eighteenth aspect of the present invention is the sound scanner according to the seventeenth aspect of the present invention, which further includes a target unit which is installed near the sound sensing unit, wherein the target unit makes the sound sensing unit targeted.

This sound scanner further includes the target unit which is installed near to the sensing unit, wherein the target unit makes the sensing unit targeted. Since the sensing position recognition unit recognizes the target unit, the position where the sound sensing unit senses the sound is recognized. Here, in the target unit, various target units can be used according to a method how the sensing position recognition unit recognizes the position, and their compositions and features can be also changed.

Consequently, since this sound scanner further includes the target unit, it can sense the position of the sound sensing unit well.

A sound scanner according to a nineteenth aspect of the present invention is the sound scanner according to the eighteenth aspect of the present invention, wherein the sensing position recognition unit recognizes the position of the sound sensing unit by at least one of a color, a size or a shape.

In this sound scanner, the sensing position recognition unit recognizes the position of the sound sensing unit by at least one of the color, the size or the shape of the target unit. More specifically, the sensing position recognition unit prescribes in advance a feature of at least one of the color, the size or the shape of the target unit. Also, it detects data that have the feature of the target unit prescribed in the picture data of the plane, the curved surface, or the space photographed in the photographing unit. It judges the detected data as the picture data for displaying the target unit in the whole picture data, and recognizes the position of the sensing unit.

Consequently, since the sensing position recognition unit recognizes the position by at least one of the color, the size or the shape of the target unit, this sound scanner can recognize the position of the sound sensing unit well. Also, since a method for recognizing the position uses the picture data of the plane, the curved surface, or the space and it is unnecessary to add the component for obtaining and processing the other data newly, the manufacturing cost can be reduced.

As described in above, since the present invention senses the factor as moving the sensing unit and it is unnecessary to record a sensing position separately, it can measure and display the factor easily and comfortably.

Also, since the present invention senses and displays the factor as moving the sensing unit in the plane, the curved surface, or the space, it can measure and display the level and the generation/containment position of the factor precisely.

Also, since the present invention senses with only one sensing unit without the necessity to install a plurality of sensing units, it can reduce a measuring cost, a manufacturing cost, etc.

As described in above, the concrete facts except for the technical object, the technical solution, the effect are included in the embodiments and the drawings, which will be described in the following. The advantages and the features of the present invention, and a method for achieving thereof will be apparent when referring to the embodiments described in detail with the drawings, which are attached. A same reference number spread all over the specification designates a same constituent element.

DETAILED DESCRIPTION OF THE PREFERRED EMBODIMENTS

Specific embodiments of the present invention will now be described in detail with reference to the accompanying drawings.

Figure 1:
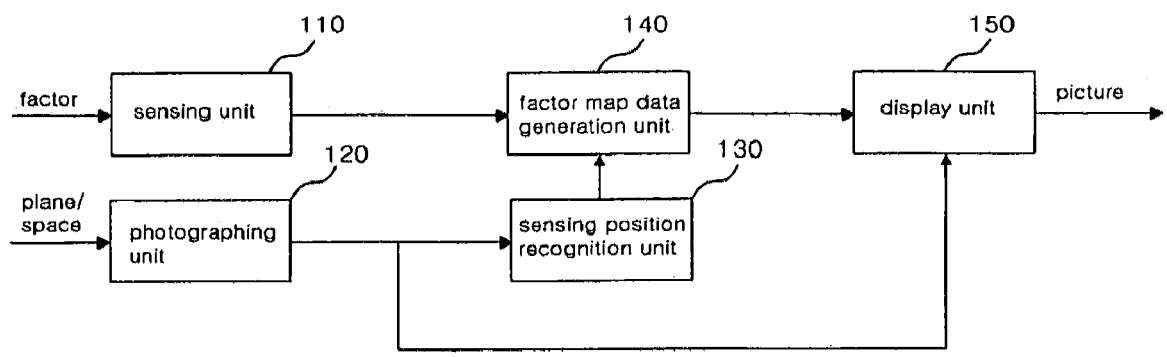
FIG. 1 is a block diagram of the apparatus for measuring and displaying a factor according to one embodiment of the present invention.
Figure 2:
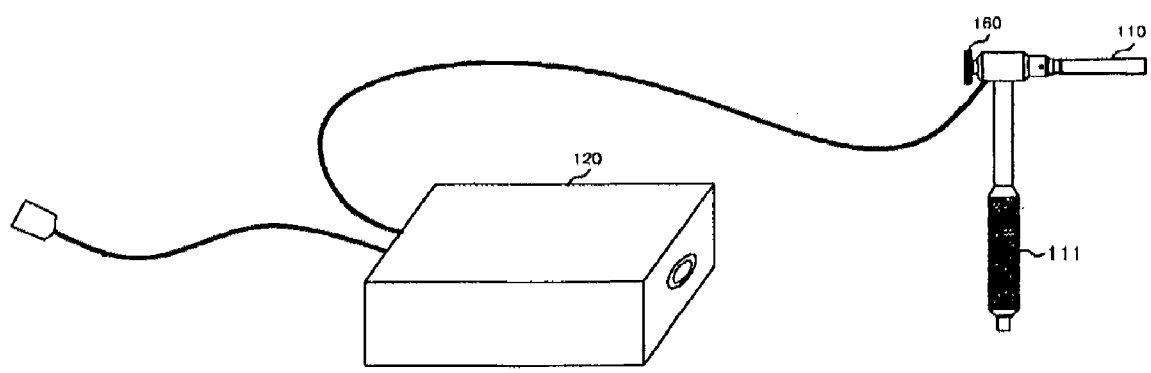
FIG. 2 is a schematic drawing that shows the sensing unit and the photographing unit of the apparatus for measuring and displaying a factor according to one embodiment of the present invention.

FIG. 1 and FIG. 2 are the drawings to explain the apparatus for measuring and displaying a factor according to one embodiment of the present invention.

In detail, FIG. 1 is a block diagram of the apparatus for measuring and displaying a factor according to one embodiment of the present invention and FIG. 2 is a schematic drawing which shows the sensing unit and the photographing unit of the apparatus for measuring and displaying a factor according to one embodiment of the present invention.

As shown in FIG. 1 and FIG. 2, the apparatus for measuring and displaying a factor 100 according to one embodiment of the present invention includes a sensing unit 110, a photographing unit 120, a sensing position recognition unit 130, a factor map data generation unit 140, and a display unit 150.

The sensing unit 110 senses the factor generated or contained in a plane, a curved surface or a space. Also, the sensing unit 110 can move in the plane, the curved surface, or the space.

Herein, the factor sensed by the sensing unit 110 is at least one of sound, vibration, temperature, humidity, supersonic waves, or electromagnetic waves. Consequently, the sensing unit 110 can be changed according to the factor intended to be sensed. For example, a sound sensor like a microphone is used as the sensing unit 110 in case that the factor is sound. Also, a vibration sensor is used as the sensing unit 110 in case that the factor is vibration. Also, a temperature sensor is used as the sensing unit 110 in case that the factor is temperature. Also, a humidity sensor is used as the sensing unit 110 in case that the factor is humidity. Also, a supersonic wave sensor is used as the sensing unit 110 in case that the factor is supersonic waves. Also, an electromagnetic wave sensor is used as the sensing unit 110 in case that the factor is the electromagnetic waves. Also, since the sensing unit 110 has more than two types of the sensors, it can sense more than two kinds of factors at a time. For example, the sensing unit 110 which has both the sound sensor and the temperature sensor can sense both a sound factor and a temperature factor at a time. Consequently, since the apparatus 100 for measuring and displaying the factor according to one embodiment of the present invention can not only sense and display various kinds of the factors, but also sense several kinds of the factors at a time, it can raise the sensing efficiency. In addition, although one embodiment of the present invention takes the sound, the vibration, the temperature, the humidity, the supersonic waves and electromagnetic waves as an example, the factors which can be sensed in the sensing unit are not limited to these. Also, it is apparent that various factors can be sensed by a certain sensor that is chosen as the sensing unit. Also, when the sensing unit 110 senses the factor in the plane or the curved surface, since it uses one of the contact type or the non-contact type of the sensing units, one embodiment of the present invention can use various sensing units.

Also, the sensing unit 110 senses continuously or intermittently with time in the plane, the curved surface, or the space when it senses the factor. More specifically, since the sensing unit 110 has a switch unit (not shown in the drawings), etc., which can turn a sensing operation on/off and always keep the switch unit on, it can sense the factor continuously. Also, since it repeats an operation for turning the switch unit on/off as occasion demands, it can sense the factor intermittently. Like this, since it senses the factor continuously or intermittently, it can sense the factor selectively.

In addition, the sensing unit 110 has a handle unit 111 which the measurer can grip and move.

The photographing unit 120 photographs the plane, the curved surface, or the space where the sensing unit is located when the sensing unit 110 senses the factor. The photographing unit 120 according to one embodiment of the present invention is composed of cameras. Here, when the sensing unit 110 senses the factor in 3-dimensional space, since the photographing unit 120 photographs with more than two cameras, the following display unit 150 can display the picture in 3-dimensions. Consequently, since the apparatus 100 for measuring and displaying the factor according to one embodiment of the present invention has a plurality of cameras, it can display a result of sensing the factor in 3-dimensional space well.

Figure 6:
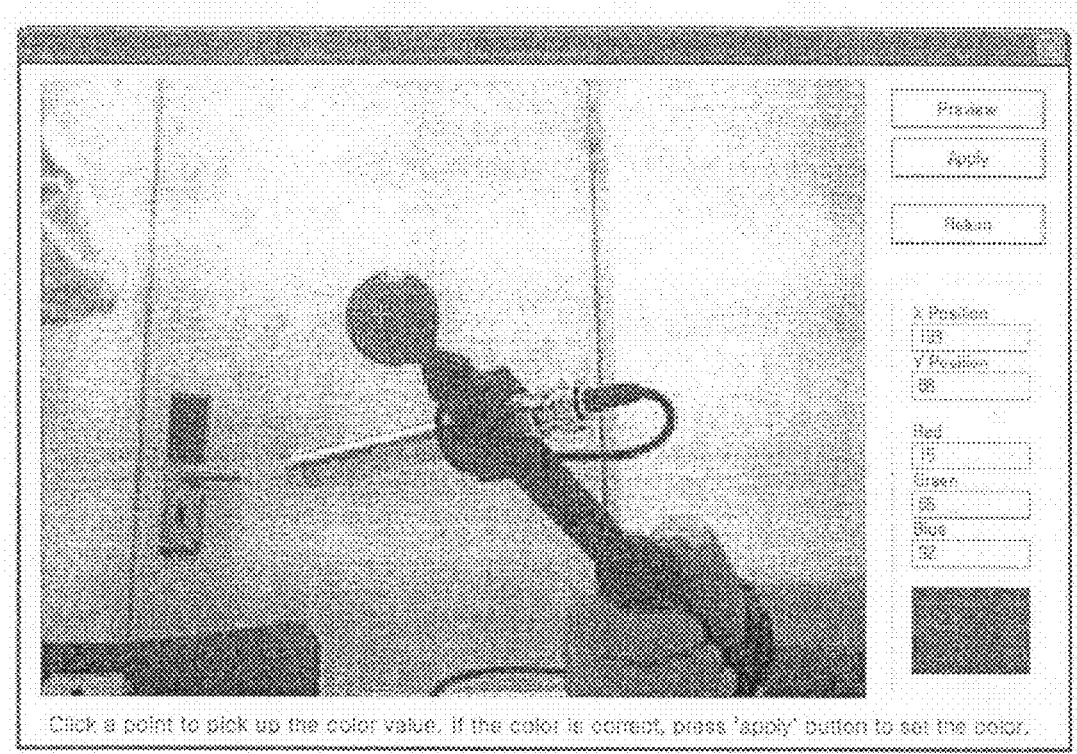
FIG. 6 is a drawing that shows a picture displaying only the picture data of 3-dimensional space photographed by the photographing unit of the sound scanner according to one embodiment of the present invention.
Figure 7:
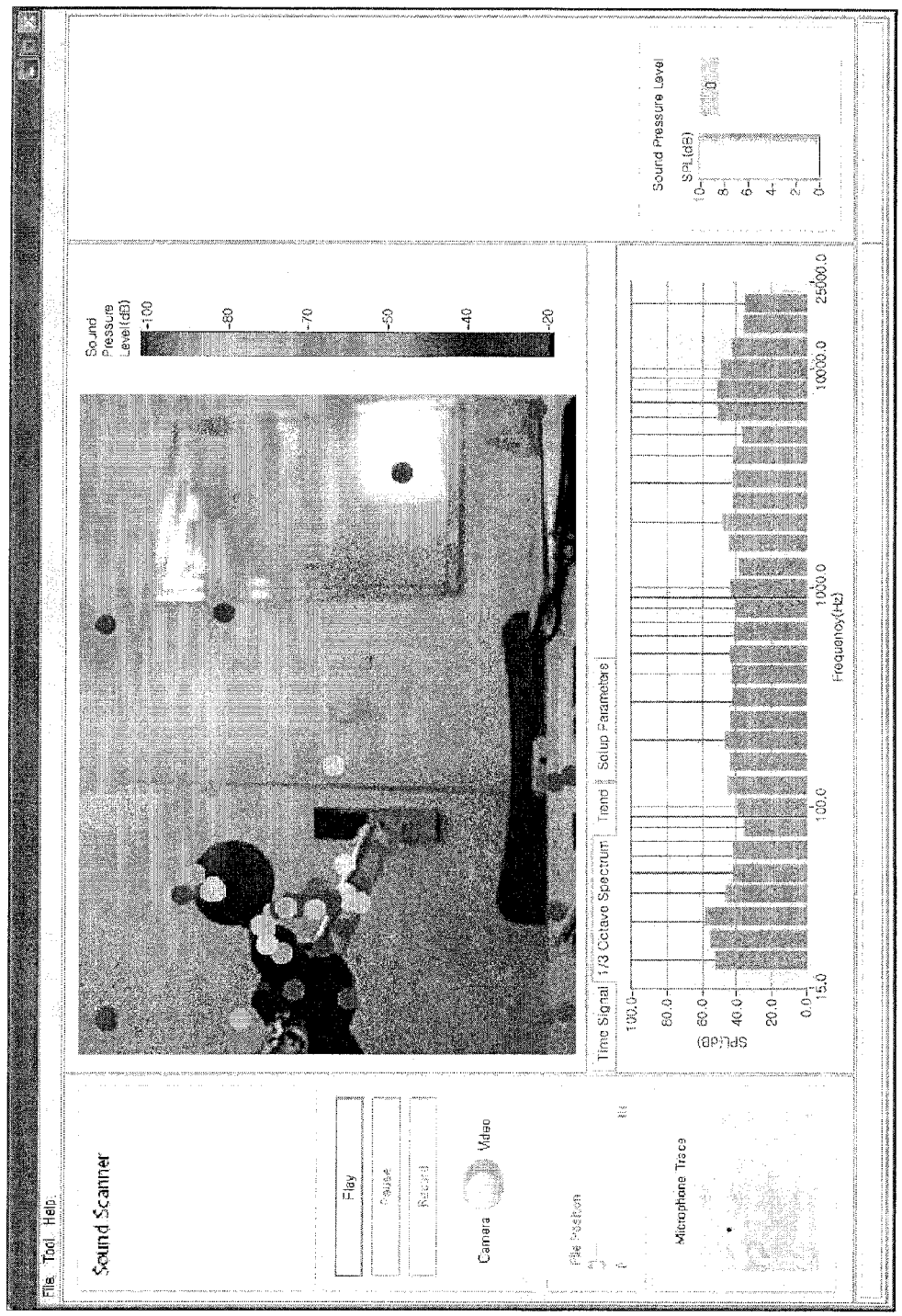
FIG. 7 is a drawing that shows a picture displaying by using the sound scanner according to one embodiment of the present invention.

The sensing position recognition unit 130 targets the sensing unit 110, and recognizes simultaneously the position of the sensing unit 110 when the sensing unit 110 senses the factor. In order to recognize the position of the sensing unit 110, the apparatus 100 for measuring and displaying the factor according to one embodiment of the present invention further includes a target unit 160 (refer to FIG. 2) installed near to the sensing unit 110. In the FIG. 2, the target unit 160 is installed on the same axis with the sensing unit 110. In FIGS. 6 and 7, the target unit is installed at the end of the handle unit and the sensing unit is installed vertically to the end of the handle unit. The target unit 160 targets the sensing unit 110. In other words, since the sensing position recognition unit 130 recognizes the target unit 160, the position where the sensing unit 110 senses the factor is recognized. In the target unit 160, various target units can be used according to a method how the sensing position recognition unit 130 recognizes the position, and their compositions and features can also be changed.

The sensing position recognition unit 130 according to one embodiment of the present invention recognizes the position of the sensing unit 110 by at least one of a color, a size or a shape of the target unit 160. For example, in the target unit 160 of FIG. 2, the target unit 160 has a blue color and a diameter of 2 cm and a disc shape, and it is installed at the rear end of the sensing unit 110 (the front end of the sensing unit 110 when it is seen from photographing unit 110). In this case, at first, at least one of the features, which is the blue color, the diameter of 2 cm or the disc shape is prescribed in advance to the sensing position recognition unit 130 as the feature that can be recognized as the target unit 160. Here, the sensing position recognition unit 130 is allowed to use only one of these features, but it is desired to raise the accuracy of the position recognition by using more than two features. Hereafter, as shown in FIG. 1, the sensing position recognition unit 130 receives the picture data of the plane, the curved surface, or the space from the photographing unit 120. The sensing position recognition unit 130 detects the portion of the data which has the above feature in this picture data. The sensing position recognition unit 130 judges the detected data as the picture data for displaying the target unit 160 in the whole picture data, and recognizes the position of the sensing unit 110. Consequently, since the sensing position recognition unit 130 recognizes the position of the sensing unit 110 by at least one of the color, the size or the shape of the target unit 160, it can recognize the position of the sensing unit 110 well. Also, since this method for recognizing the position uses the picture data of the plane, the curved surface, or the space photographed in the photographing unit 120 and it is unnecessary to add a new component for obtaining and processing the other data, the manufacturing cost can be reduced.

The method for recognizing the position according to one embodiment of the present invention which uses a picture data, has the target unit 160 which has the features of the color, the size or the shape, but if it can recognize the position of the sensing unit 110 well, then it is allowed to use other methods. For example, in a case in which a GPS (global positioning system) method is used, the target unit becomes a GPS receiver, and the sensing position recognition unit has not the picture data processing unit but a GPS data processing unit. Also, one embodiment of the present invention recognizes the position of the sensing unit 110 by using the method for recognizing the target unit 160, but if it can recognize the position of the sensing unit 110 without the target unit 160 well, then it is possible to exclude the target unit and target the sensing unit 110 itself.

The factor map generation unit 140 maps the factor sensed in the sensing unit 110 onto the position recognized in the sensing position recognition unit 130 and generates the factor map data. In other words, the factor map data include factor data and position data. Here, in order to show the sensed factor quantitatively, the factor data are data that express the factor numerically according to a prescribed standard and indicate the numeral size of the number. Also, the position data is a data that indicates the position of the sensing unit 110 recognized as two-dimensional or three-dimensional coordinate data.

The display unit 150 overlays the factor map data with the picture data and displays the factor map data overlaid with the picture data. Here, the factor map data display by using at least one of the color dot, the number, or the contour. Accordingly, the plane, the curved surface, or the space that becomes the background, and the sensing unit 110, which is stopping or moving, and at least one of the color dot, the number, or the contour, which is located in the sensing unit 110, is displayed in the picture displayed by the display unit 150. Here, in order to display the factor quantitatively, the display unit 150 displays the high or the low of the level of the factor in the case of the color dot and contour by changing the color, or in the case of the number by the numeral size of the number. Consequently, the factor can be displayed variously, and can be recognized easily by the measurer. Furthermore, one embodiment of the present invention is allowed to use not only the color dot, the number, or the contour but also other indicators which can show the factor quantitatively. Also, the display unit 150 controls the transparency of at least one of the color dot, the number, or the contour and displays. At this time, if the transparency is raised, the plane, the curved surface, or the space, which is picture data, is well displayed, and if the transparency is lowered, one of the color dot, the number, or the contour, which is a factor map data, is well displayed. The measurer can select the transparency as occasion demands. Consequently, the factor can be displayed more variously, and the plane, the curved surface, or the space, or one of the color dot, the number, or the contour can be recognized easily by the measurer.

Also, when the display unit 150 overlays the factor map data with the picture data and displays the factor map data overlaid with the picture data, it displays continuously or intermittently with time in the plane, the curved surface, or the space. In other words, since it displays the factor continuously or intermittently, it can perform the measurement of the factor selectively.

Also, in one embodiment of the present invention, each operation of the component units is performed in real-time. In other words, operations that sense the factor, and recognize the position of the factor, map the factor sensed onto the position sensed and generate a factor map data, and overlay the factor map data with the picture data and display the factor map data overlaid with the picture data, are performed in real-time. Consequently, the information of the sensed factor can be displayed in real time.

Also, the apparatus 100 for measuring and displaying a factor according to one embodiment of the present invention can further include a storage unit (not shown in the drawings) that stores the factor sensed in the sensing unit 110 or the picture data of the plane, the curved surface, or the space photographed in the photographing unit 120. Since the factor or the picture data stored in the storage unit is raw data, it can be used by being read from the storage unit at any time. Consequently, it is possible to re-measure or to re-display the factor. Also, it is possible to accumulate them to measure or display the factor. Consequently, since it further includes the storage unit, it can measure and display the factor variously.

Like this, since the apparatus 100 for measuring and displaying a factor according to one embodiment of the present invention can sense the factor as moving the sensing unit 110 and it is unnecessary to record the sensing position separately, it can measure and display the factor easily and conveniently. Also, since it senses and displays the factor as moving the sensing unit 120 in the plane, the curved surface, or the space, it can measure and display the level and the generation/containment position of the factor precisely. Also, since it senses with only one sensing unit 110 without the necessity to install a plurality of the sensing units, it can reduce a measuring cost, a manufacturing cost etc.

Figure 3:
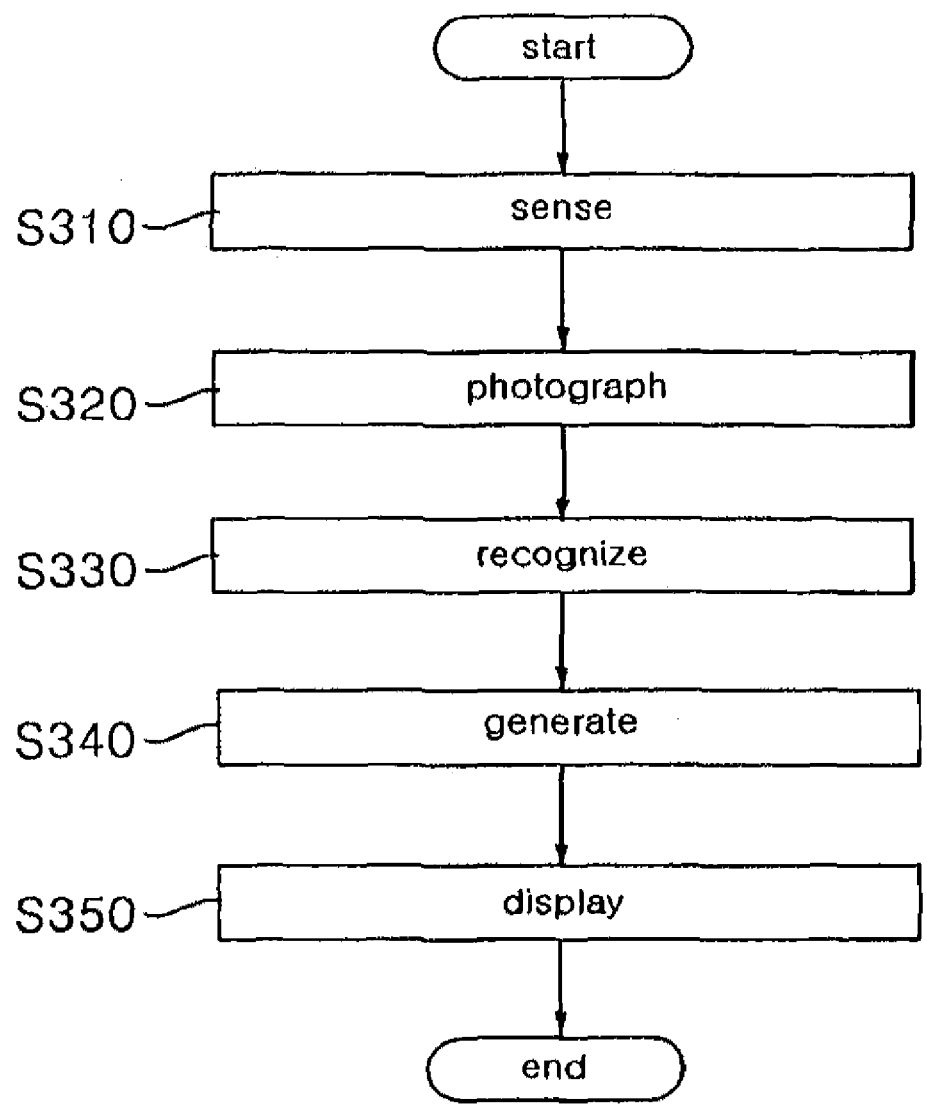
FIG. 3 is a drawing for explaining the method for measuring and displaying a factor according to one embodiment of the present invention

FIG. 3 is the drawing for explaining the method for measuring and displaying a factor according to one embodiment of the present invention.

As shown in FIG. 3, at first, the method for measuring and displaying a factor according to one embodiment of the present invention senses the factor generated or contained in the plane, the curved surface, or the space by using the sensing unit S310. The sensing unit can move in the plane, the curved surface, or the space. At this time, the sensed factor is at least one of the sound, the vibration, the temperature, the humidity, the supersonic waves or the electromagnetic waves. Also, in case of sensing the factor in the plane or the curved surface, it can use one of the contact type or the non-contact type of the sensing units. Also, the factor senses continuously or intermittently with time in the plane, the curved surface, or the space.

Afterward, along with sensing the factor, the method according to one embodiment of the present invention can photograph the plane, the curved surface, or the space where the sensing unit is located S320. At this time, by photographing with more than two cameras, it can display the picture in three dimensions in the following step of displaying.

Afterward, by targeting the sensing unit, the step of recognizing S330 recognizes simultaneously the position of the sensing unit when it senses the factor in the step of sensing S310. At this time, in order to recognize the position of the sensing unit, the target unit is installed near to the sensing unit, and recognizes the position of the sensing unit by at least one of the color, the size or the shape of the target unit. The more detailed explanation about the step of recognizing S330 will be described by referring to FIG. 4.

Afterward, the step of generating S340 maps the factor sensed in the step of sensing S310 onto the position recognized in the step of recognizing S330 and generates the factor map data. In other words, the factor map data include factor data and position data. Here, the factor data are data that are for showing the sensed factor quantitatively, and express the factor numerically according to the prescribed standard, and indicate the numeral size of the number. The position data are data that indicate the position of the sensing unit recognized as 2-dimensional or 3-dimensional coordinate data. The more detailed explanation about the step of generating S340 will be described by referring to FIG. 5.

Afterward, the step of displaying S350 overlays the factor map data with the picture data and displays the factor map data overlaid with the picture data. At this time, the factor map data are displayed with at least one of the color dot, the number, or the contour. Accordingly, the plane, the curved surface, or the space which becomes background, the sensing unit, which is stopping or moving, and at least one of the color dot, the number, or the contour, are displayed in the picture indicated in the step of displaying S350. Also, the transparency of at least one of the color dot, the number, or the contour is controlled. Also, when the step of displaying S350 overlaps the factor map data with the picture data and displays the factor map data overlaid with the picture data, it displays continuously or intermittently with time in the plane, the curved surface, or the space.

Additionally, since the method according to one embodiment of the present invention performs each of the steps in real time, it can measure the factor and display an information of the factor in real time.

Additionally, the method for measuring and displaying a factor according to one embodiment of the present invention can include further the step of storing (not shown in the drawings) that stores the factor sensed in the step of sensing S310 or the picture data of the plane, the curved surface, or the space photographed in the step of photographing S320. Since the factor data or the picture data stored in the step of storing are raw data, it can be used by being read from the storage unit at any time.

Like this, since the method for measuring and displaying a factor senses the factor as moving the sensing unit and it is unnecessary to record the sensing position separately, it can measure and display the factor easily and conveniently. Also, since it senses and displays as moving the sensing unit in the plane, the curved surface, or the space, it can measure and display the level and the generation/containment position of the factor precisely. Also, since it senses with only one sensing unit without the necessity to install a plurality of the sensing units, it can reduce a measuring cost, a manufacturing cost, etc.

Figure 4:
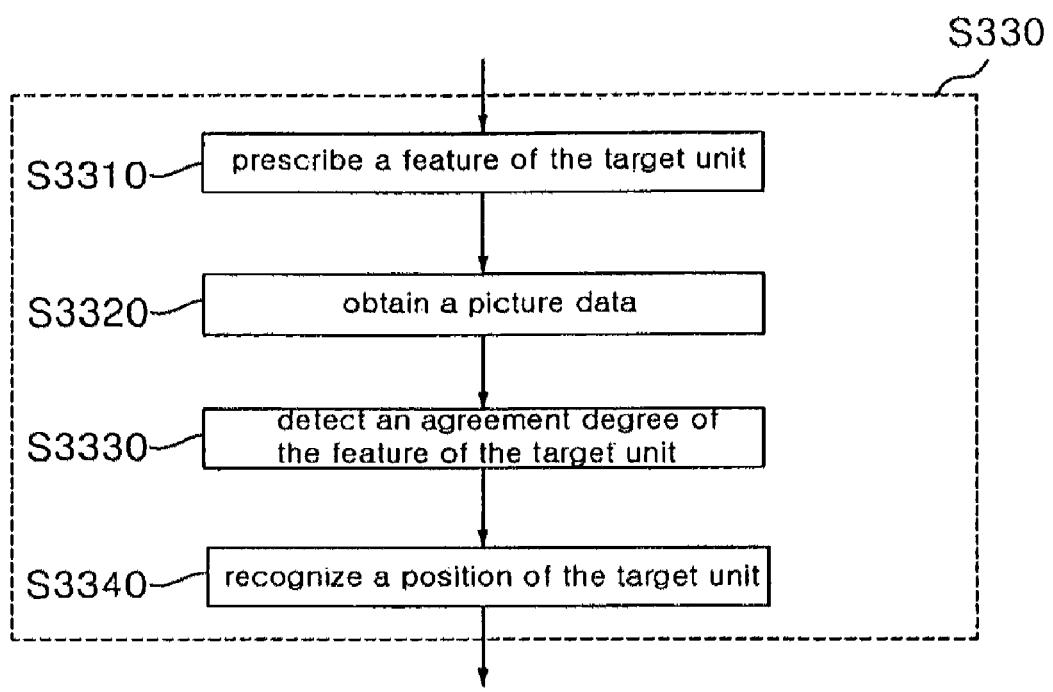
FIG. 4 is a drawing for explaining the step of recognizing of the method for displaying a sound quality according to one embodiment of the present invention.

FIG. 4 is the drawing for explaining the step of recognizing of the method for displaying a sound quality according to one embodiment of the present invention.

As shown in FIG. 4, the step of recognizing S330 of the method for displaying a sound quality according to one embodiment of the present invention recognizes the position of the sensing unit through a step of prescribing a feature of the target unit S3310, a step of obtaining a picture data S3320, a step of detecting an agreement degree of the feature of the target unit S3330, and a step of recognizing a position of the target unit S3340.

At first, the step of prescribing a feature of the target unit S3310 prescribes at least one of the color, the size or the shape of the target unit as the feature. These features are prescribed by obtaining only the picture data of the target unit separately and extracting each of the features of the target unit from the picture data.

Afterward, the step of obtaining a picture data S3320 obtains the picture data of the plane, the curved surface, or the space photographed in the step of photographing S320.

Afterward, the step of detecting an agreement degree of the feature of the target unit S3330 detects the portion of the data which has the highest agreement degree as compared with the feature prescribed in the step of prescribing a feature of target unit S3310, in the picture data obtained in the step of obtaining a picture data S3320.

Afterward, the step of recognizing a position of the target unit S3340 analyzes where the data detected in the step of detecting an agreement degree of the feature of the target unit S3330 is located in the whole picture data, and recognizes the position of the target unit in the whole picture data.

Hereby, since the step of recognizing S330 recognizes the position by at least one of the color, the size or the shape of the target unit, it can recognize the position of the target unit well.

Figure 5:
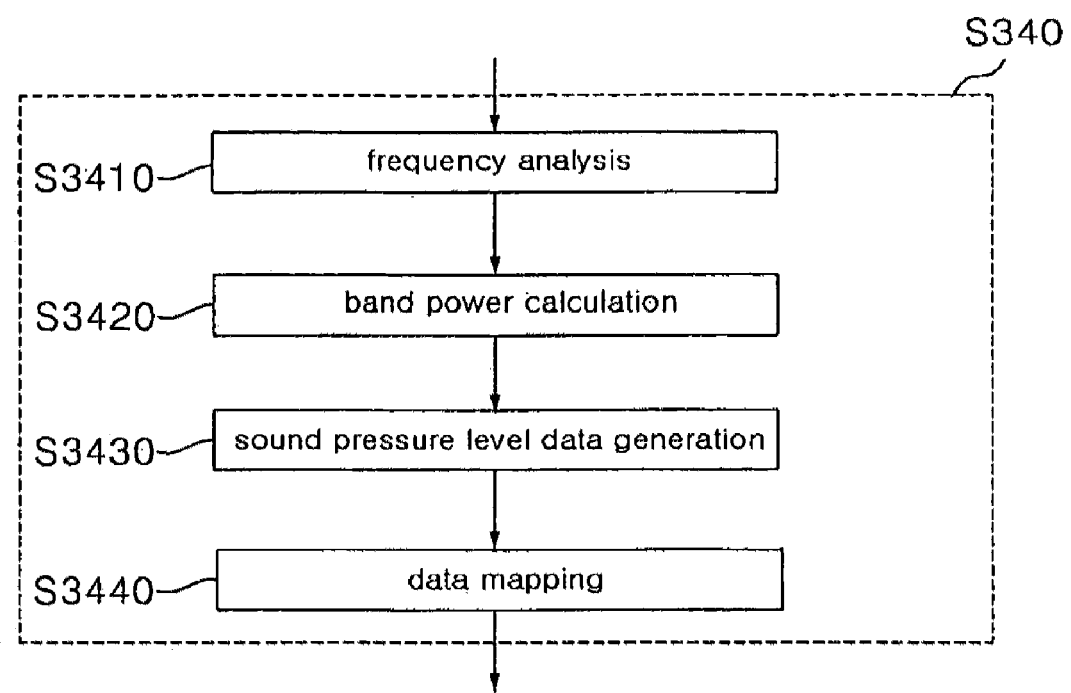
FIG. 5 is a flowchart that illustrates the step of generating of the method for displaying a sound quality according to one embodiment of the present invention.

FIG. 5 is the drawing for explaining the step of generating of the method for displaying a sound quality according to one embodiment of the present invention.

Specifically, FIG. 5 is a flowchart which shows the step of generating in case that the factor is the sound, i.e., the step of generating a sound map data.

As shown in FIG. 5, the step of generating the sound map data generates the sound map data through frequency analysis step S3410, band power calculation step S3420, sound pressure level data generation step S3430 and data mapping step S3440.

At first, the frequency analysis step S3410 analyzes the frequency of the sound sensed in the step of sensing S310.

Afterward, the band power calculation step S3420 calculates the band power that the measurer selectes as occasion demands.

Afterward, the sound pressure level data generation step S3430 generates a sound pressure level data in which the high and the low of the sound pressure of the sensed sound is expressed numerically.

Afterward, the data mapping step S3440 maps the sound pressure level data generated in the sound pressure level data generation step S3430 onto the position of the sensing unit recognized in the step of recognizing the sensing position, i.e., the position data and generates the sound map data.

FIG. 6 and FIG. 7 are the drawings for explaining the sound scanner according to one embodiment of the present invention.

Specifically, FIG. 6 is a drawing that shows a picture displaying only the picture data of 3-dimensional space photographed by the photographing unit of the sound scanner according to one embodiment of the present invention. Also, FIG. 7 shows the picture that senses the sound, and recognizes the position, and overlays the sound map data with the picture data and displays the sound map data overlaid with the picture data by using the sound scanner according to one embodiment of the present invention.

As shown in FIG. 6 and FIG. 7, the sound scanner according to one embodiment of the present invention senses the sound generated in 3-dimensional space and displays the sound pressure level of the sound with the color dot, in the position where the sound sensing unit is located, along with the 3-dimensional space. Consequently, since the sound scanner according to one embodiment of the present invention senses the sound as moving the sound sensing unit and it is unnecessary to record the sensing position separately, it can measure and display the sound easily and conveniently. Also, since it senses and displays the sound as moving the sound sensing unit in the plane, the curved surface, or the space, it can measure and display the level and the generation/containment position of the sound precisely. Also, since it senses by using only one sound sensing unit without the necessity to install a plurality of the sound sensing units, it can reduce a measuring cost, a manufacturing cost etc. Additionally, a blue sphere (i.e. large circle painted), shown in FIG. 6 and FIG. 7, is a target unit having a shape unlike FIG. 2. Also, a red point (i.e. small circle painted) of a grey picture in a left lower part of FIG. 7 displays the position of the sensing unit sensed in the sensing position recognition unit.

As described above, a technical composition of the present invention is to be understood that one skilled in the art is not to modify a technical idea or an essential feature of the present invention but to take effect as the other concrete embodiments.

Therefore, it is to be understood that embodiments described above are not qualifying but exemplary in all points. Also, the scope of the present invention will be included in the following claims than above detail explanation, and it is to be analyzed that the meaning and scope of the claims and all changes deducted from equivalent arrangements or modifications included within the scope of the present invention.

INDUSTRIAL APPLICABILITY

The apparatus for measuring and displaying a factor, the method for measuring and displaying a factor, the program for measuring and displaying a factor being configured to cause a computer to run a method for measuring and displaying a factor, and the sound scanner according to the present invention, can measure and display the factor easily and conveniently, and can measure and display the level and the generation/containment position of the factor precisely, and can reduce a measuring cost, a manufacturing cost, etc. Consequently, when performing a production of the electronic devices and the mechanical devices, a maintenance/repair of an industrial facility, and an experiment at a laboratory, the present invention is useful to measure and display the level and the generation/containment position of the factor generated or contained at a certain portion of the device, the facility, etc.

What is claimed is:

1. An apparatus for measuring and displaying a factor comprising:
   a sensing unit being movable in a plane, a curved surface, or a space where a factor to be sensed is generated or contained, and the sensing unit being configured to sense the factor;
   a target unit configured adjacent to the sensing unit;
   a photographing unit being configured to photograph the plane, the curved surface, or the space and to generate picture data of the plane, the curved surface, or the space;
   a sensing position recognition unit being configured to recognize simultaneously a position of the sensing unit by recognizing the target unit when the sensing unit senses the factor;
   a factor map data generation unit being configured to map the factor sensed in the sensing unit onto the position sensed in the sensing position recognition unit and to generate factor map data; and
   a display unit being configured to overlay the factor map data with the picture data and to display the factor map data overlaid with the picture data;
   the sensing position recognition unit configured to recognize the position of the sensing unit by recognizing at least one of a color, a size, and a shape of the target unit.

2. The apparatus for measuring and displaying a factor according to claim 1, further comprising
   a storage unit that stores the factor or the picture data.

3. The apparatus for measuring and displaying a factor according to claim 1, wherein
   the sensing unit senses continuously or intermittently with time when sensing the factor.

4. The apparatus for measuring and displaying a factor according to claim 1, wherein
   the display unit displays continuously when displaying the factor map data overlaid with the picture data.

5. The apparatus for measuring and displaying a factor according to claim 1, wherein
   the display unit displays the factor map data with at least one of a color dot, a number, or a contour.

6. The apparatus for measuring and displaying a factor according to claim 5, wherein
   a transparency of at least one of the color dot, the number, or the contour is controlled in the display unit.

7. The apparatus for measuring and displaying a factor according to claim 1, wherein
   the factor is at least one of sound, vibration, temperature, humidity, supersonic waves, or electromagnetic waves.

8. The apparatus for measuring and displaying a factor according to claim 1, wherein
   the sensing unit contacts the plane or the curved surface.

9. The apparatus for measuring and displaying a factor according to claim 1, wherein
   the photographing unit photographs by using more than two cameras.

10. The apparatus for measuring and displaying a factor according to claim 1, wherein
    operations that sense the factor, recognize the position, and display the factor map data overlaid with the picture data are accomplished in real time.

11. A method for measuring and displaying a factor comprising:
    sensing a factor by using a sensing unit being movable in a plane, a curved surface, or a space where the factor to be sensed is generated or contained, and the sensing unit senses the factor;
    photographing the plane, the curved surface, or the space;

recognizing simultaneously a position of the sensing unit by recognizing a target unit being adjacent to the sensing unit when sensing the factor in the step of sensing;

generating a factor map data by mapping the factor sensed onto the position sensed;

overlaying the factor map data with picture data; and displaying the factor map data overlaid with the picture data, the recognizing simultaneously the position of the sensing unit by recognizing the target unit including recognizing at least one of a color, a size, and a shape of the target unit.

12. A non-transitory computer readable medium for storing a program for measuring and displaying a factor being configured to cause a computer to run a method for measuring and displaying a factor, the program comprising:

sensing a factor by using a sensing unit being movable in a plane, a curved surface, or a space where the factor to be sensed is generated or contained, and the sensing unit senses the factor;

photographing the plane, the curved surface, or the space;

recognizing simultaneously a position of the sensing unit by recognizing a target unit being adjacent to the sensing unit when sensing the factor;

generating a factor map data by mapping the factor sensed onto the position sensed;

overlaying the factor map data with picture data; and displaying the factor map data overlaid with the picture data, the recognizing simultaneously the position of the sensing unit by recognizing the target unit including recognizing at least one of a color, a size, and a shape of the target unit.

13. A sound scanner comprising:

a sound sensing unit being movable in a plane, a curved surface, or a space where a sound to be sensed is generated or contained, the sound sensing unit being configured to sense the sound;

a photographing unit being configured to photograph photograph the plane, the curved surface, or the space and to generate a picture data of the plane, the curved surface, or the space;

a target unit being configured adjacent to the sound sensing unit;

a sensing position recognition unit being configured to recognize simultaneously a position of the sound sensing unit by recognizing the target unit when the sound sensing unit senses the sound;

a sound map data generation unit being configured to map the sound sensed in the sound sensing unit onto the position sensed in the sensing position recognition unit and to generate a sound map data; and a display unit being configured to overlay the sound map data with the picture data and to display the sound map data overlaid with the picture data, the sensing position recognition unit being configured to recognize the position of the sensing unit by recognizing at least one of a color, a size, and a shape of the target unit.

14. The apparatus for measuring and displaying a factor according to claim 1, further comprising a storage unit that stores the factor or the picture data.

15. The apparatus for measuring and displaying a factor according to claim 1, wherein the display unit displays intermittently with time when displaying the factor map data overlaid with the picture data.

16. The apparatus for measuring and displaying a factor according to claim 1, wherein the sensing unit does not contact the plane or the curved surface.

* * * * *